United States Patent [19]
Smith

[11] Patent Number: 6,095,925
[45] Date of Patent: *Aug. 1, 2000

[54] SEAL ASSEMBLY AND SEAL GUARD FOR A UNIVERSAL JOINT

[75] Inventor: Johnny N. Smith, Toledo, Ohio

[73] Assignee: Dana Corporation, Toledo, Ohio

[ * ] Notice: This patent is subject to a terminal disclaimer.

[21] Appl. No.: 08/949,108

[22] Filed: Oct. 10, 1997

[51] Int. Cl.[7] .................................................. F16D 3/16
[52] U.S. Cl. ......................... 464/131; 464/128; 464/133; 277/562
[58] Field of Search .................................... 464/128, 131, 464/133; 277/572, 573; 403/74, 57

[56] References Cited

U.S. PATENT DOCUMENTS

| | | |
|---|---|---|
| 3,174,813 | 3/1965 | Selz . |
| 3,218,692 | 11/1965 | Kayser . |
| 3,262,284 | 7/1966 | Maxwell-Holroyd . |
| 3,457,732 | 7/1969 | Decouzon . |
| 3,479,840 | 11/1969 | Meyers . |
| 3,779,039 | 12/1973 | Schultenkamper . |
| 3,906,746 | 9/1975 | Haines ..................................... 464/131 |
| 4,021,085 | 5/1977 | Willyard .............................. 464/131 X |
| 4,129,016 | 12/1978 | Olson, Sr. ................................. 464/128 |
| 4,576,382 | 3/1986 | Scharting et al. . |
| 4,710,150 | 12/1987 | Mangiavacchi . |
| 4,810,233 | 3/1989 | Crane, Jr. et al. . |
| 4,874,349 | 10/1989 | Gall . |
| 5,588,915 | 12/1996 | Smith .................................. 464/131 X |
| 5,716,277 | 2/1998 | Reynolds ................................ 464/131 |
| 5,769,723 | 6/1998 | Faulbecker et al. ..................... 464/131 |
| 5,813,916 | 9/1998 | Lentini et al. ........................... 464/128 |

FOREIGN PATENT DOCUMENTS

| | | | |
|---|---|---|---|
| 3115659 | 11/1982 | Germany ................................ | 464/128 |

Primary Examiner—Terry Lee Melius
Assistant Examiner—David E. Bochna
Attorney, Agent, or Firm—MacMillan, Sobanski & Todd, LLC

[57] ABSTRACT

A seal assembly and seal guard are provided for a bearing cup positioned on a trunnion of a universal joint. The seal assembly includes a support ring and an elastomeric seal. The support ring is generally L-shaped in cross section, having a lower radial flange that is connected to an axial portion. The axial portion of the support ring is press fit within an inner bearing surface of the bearing cup. The support ring flange extends radially outwardly adjacent the open end of the bearing cup. The elastomeric seal is disposed within the support ring axial portion. An annular elastomeric seal guard is removably secured to the seal assembly. The seal guard is generally funnel shaped. The seal guard has an upper body with an annular interior groove. The interior groove has a diameter slightly larger than the diameter of the support ring flange. Thus, the seal guard can be secured to the support ring flange. The seal guard has a lower body inclined radially inwardly from the upper body. The lower body has an interior annular sealing surface. The seal guard interior sealing surface defines an inner diameter that is smaller than a diameter of a outer sealing surface along the circumference of the trunnion of the universal joint. When the bearing cup is installed on the trunnion, the seal guard engages the trunnion in a light press fit. The press fit establishes a lubrication chamber. The lubrication chamber is bordered by the trunnion, elastomeric seal, and seal guard. When filled with grease, the lubrication chamber provides a waterproof compartment to keep moisture away from the seal assembly.

29 Claims, 3 Drawing Sheets

SEAL ASSEMBLY AND SEAL GUARD FOR A UNIVERSAL JOINT

BACKGROUND OF THE INVENTION

This invention relates in general to a universal joint suitable for use with driveshafts, such as vehicle steering shafts or driveshaft systems. More particularly, this invention pertains to an improved structure for a seal assembly and seal guard adapted for use in such a universal joint.

Universal joints are well known devices that provide a driving connection between two members adapted to rotate about non-aligned axes of rotation. Universal joints are widely used between consecutive rotatable drive shaft sections in vehicle drive train systems. A typical universal joint includes a cross having a central body portion with four cylindrical trunnion extending outwardly therefrom. The trunnion are oriented in a single plane and extend at right angles relative to one another. A hollow cylindrical bearing cup is mounted on the end of each of the trunnion. Needle bearings or similar means are provided between the outer cylindrical surfaces of the trunnion and the inner cylindrical surfaces of the bearing cups to facilitate relatively low friction rotational movement therebetween. The bearing cups that are mounted on a first opposed pair of the trunnion are connected to a first end yoke which, in turn, is secured to an end of a first drive shaft section or other component of the vehicle drive train system. Similarly, the bearing cups mounted on a second opposed pair of the trunnion are connected to a second end yoke which, in turn, is secured to an end of a first drive shaft section or other component of the vehicle drive train system.

Typically, each of the trunnion has an internal lubricant passageway formed therein. The lubricant passageways communicate with a central cavity formed in the body of the cross. An external lubricant fitting is mounted in an aperture formed through the body of the cross to provide one-way fluid communication into the central cavity. Thus, lubricant injected into the cross through the fitting flows outwardly from the central cavity through each of the lubricant passageways to the bearing cups mounted on the ends of the trunnion. The lubricant passes around the outer ends of the trunnion and inwardly back between the outer cylindrical surfaces of the trunnion and the inner cylindrical surfaces of the bearing cups. In this manner, the needle bearings can be lubricated for use.

It is known to provide elastomeric seals within or about the open ends of the bearing cups to retain the lubricant in the regions of the universal joint where the needle beings are located, and further to minimize the entry of dirt, water, or other contaminants therein. Additionally, it is also known to provide rigid guards within or about the open ends of the bearing cups to prevent the entry of dirt, water, or other contaminants into the regions of the universal joint where the needle bearings are located and to protectively cover the elastomeric seals. In some instances, the seals and the guards are combined into a single seal and guard assembly. A number of conventional seals, guards, and seal and guard assemblies are known in the art. However, known structures have been found to be unduly complex and somewhat difficult to assemble. Thus, it would be desirable to provide an improved structure for a seal and guard assembly which is simple and inexpensive in construction and assembly.

SUMMARY OF THE INVENTION

The above object as well as other objects not specifically enumerated are achieved by a seal assembly and seal guard adapted for use with a bearing cup assembly for a cross member of a universal joint, with the seal assembly including a support ring and a seal secured to the support ring, the support ring including an axially extending portion and a radially extending flange portion, and with the seal guard being a flexible elastomeric seal guard secured to the seal assembly, the seal guard including an upper body portion with an interior groove, the radially extending flange portion of the support ring being trapped by the interior groove of the upper body potion to secure the seal guard to the seal assembly, and the seal guard having a lower body portion extending axially from the upper body portion, the lower body portion having an interior sealing surface.

According to this invention, there is also provided a bearing cup assembly adapted for use with a cross member of a universal joint, including a hollow bearing cup having an open end, an inner bearing surface, and a closed end, a seal assembly secured to the bearing cup and including a support ring and a seal secured to the support ring, the support ring including an axially extending portion and a radially extending flange portion, and a flexible elastomeric seal guard secured to the seal assembly, the seal guard including an upper body portion with an interior groove, the radially extending flange portion of the support ring being trapped by the interior groove of the upper body portion to secure the seal guard to the seal assembly, and the seal guard having a lower body portion extending axially from the upper body portion, the lower body portion having an interior sealing surface.

According to this invention, there is also provided a cross for a universal joint, including a body portion having a trunnion extending outwardly from the body portion, the trunnion including an outer bearing surface, a bearing cup having an open end, an inner bearing surface, and a closed end, the bearing cup being disposed about the trunnion such that the inner bearing surface of the bearing cup is disposed coaxially about the outer bearing surface of the trunnion, a plurality of bearings disposed between the inner bearing surface of the bearing cup and the outer bearing surface of the trunnion for permitting rotation of the bearing cup relative to the trunnion, a seal assembly secured to the bearing cup and including a support ring and a seal secured to the support ring, the support ring including an axially extending portion and a radially extending flange portion, and, a flexible elastomeric seal guard secured to the seal assembly, the seal guard including an upper body portion with an interior groove, the radially extending flange portion of the support ring being trapped by the interior groove of the upper body portion to secure the seal guard to the seal assembly, and the seal guard having a lower body portion extending axially from the upper body portion, the lower body portion having an interior sealing surface.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
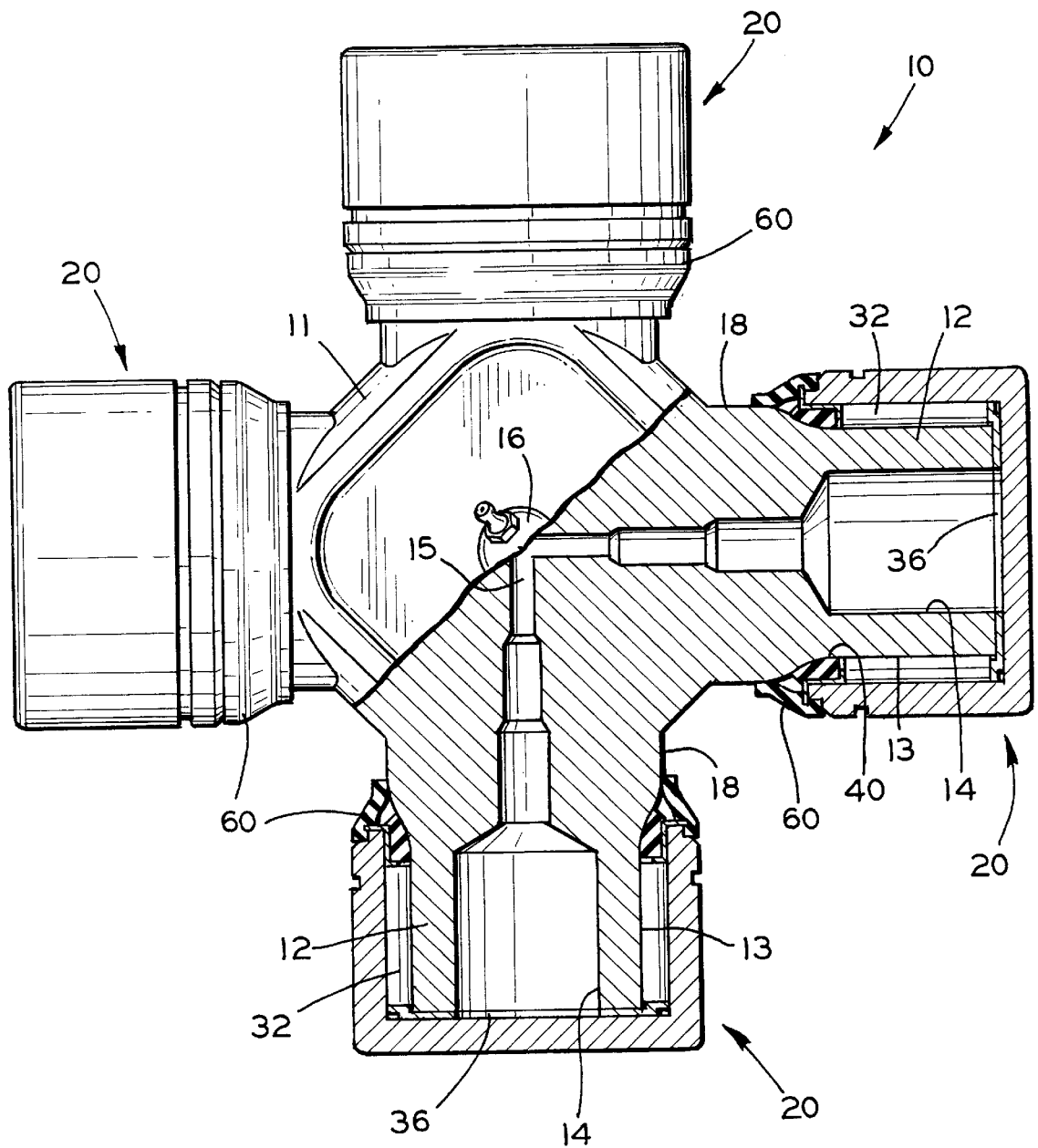
FIG. 1 is an elevational view, partially in cross section, of a cross for a universal joint in accordance with this invention.

Referring now to the drawings, there is illustrated in FIG. 1 a cross, indicated generally at 10, in accordance with this invention. The cross 10 is adapted to form a portion of a conventional universal joint assembly (not shown), the structure and operation of which is well known in the art. The cross 10 includes a central body portion 11 having a plurality of trunnion 12 extending outwardly therefrom. In the illustrated embodiment, four of such trunnion 12 are formed integrally with the body portion 11. The trunnion 12 are disposed at right angles relative to one another and are oriented to lie in a single plane. The trunnion 12 are generally hollow and cylindrical in shape and define respective axes therethrough. Each of the trunnion 12 has a cylindrical multiple diameter outer bearing surface 13 positioned at the radially outward ends of the trunnion. A passageway 14 is formed through each of the trunnion 12 extending outwardly from the body portion 11. The passageways 14 all communicate with a central cavity 15 formed in the body portion 11. A conventional lubricant fitting 16 is disposed in a central aperture (not shown) formed through the body portion 11. The central aperture communicates with the central cavity 15 of the body portion 11. Each of the trunnion terminates in an end portion having a lower cylindrical outer sealing surface 18. Typically the outer sealing surface 18 will just be an outer circumference of the trunnion and will not require any special machining or surface preparation.

Figure 2:
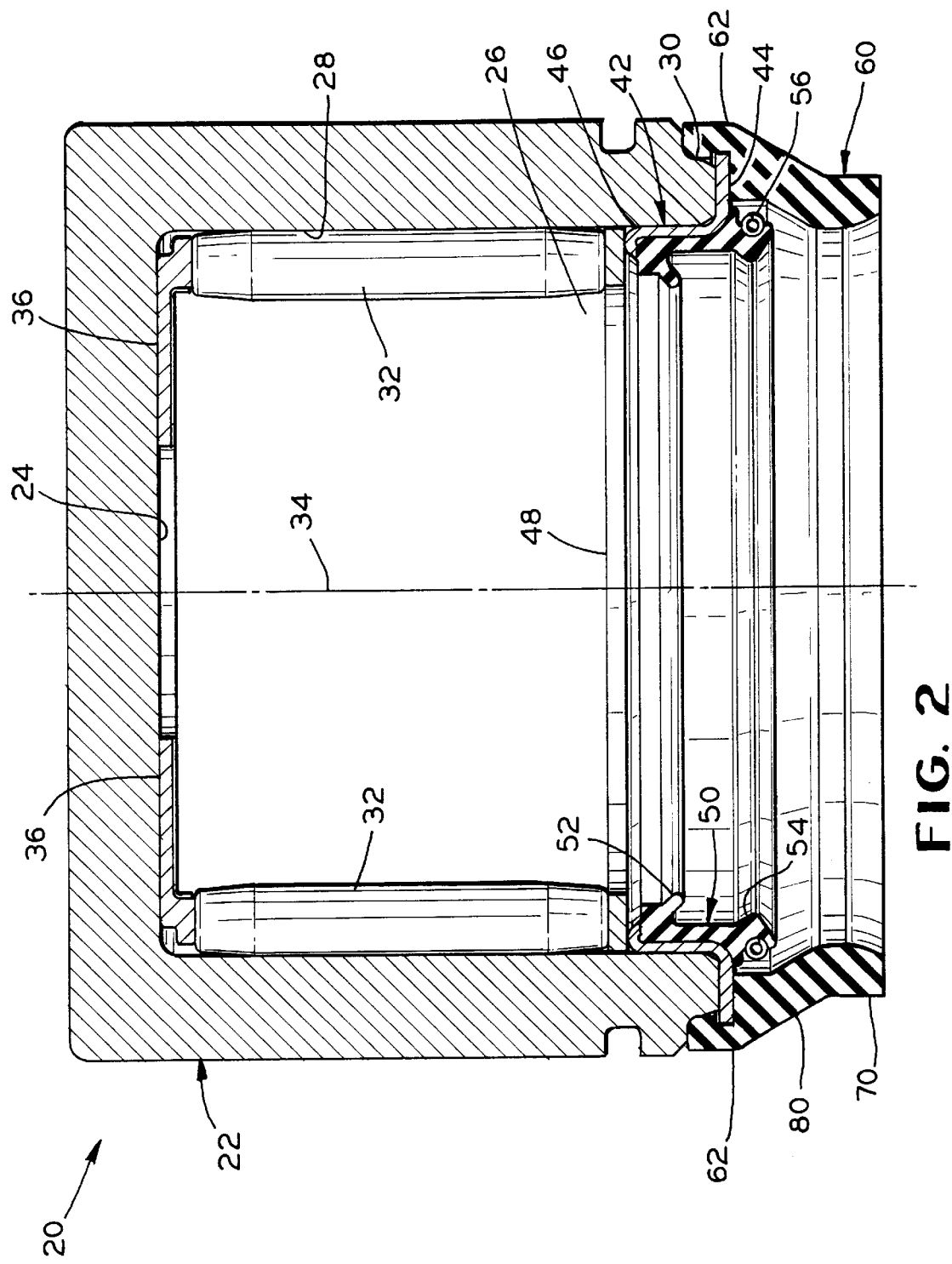
FIG. 2 is an enlarged sectional elevational view of one of the bearing cup assemblies of the cross member illustrated in FIG. 1, including a bearing cup, a thrust plate, a plurality of bearings, and a seal assembly and seal guard.

A bearing cup assembly, indicated generally at 20, is mounted about each of the outer bearing surfaces 13 of the trunnion 12. As best shown in FIG. 2, each of the bearing cup assemblies 20 includes a hollow cylindrical bearing cup 22 having a closed end 24, an open end 26, and a cylindrical inner bearing surface 28. The bearing cup 22 further includes a reduced outer diameter portion 30 located adjacent to the open end 26 thereof When mounted about the trunnion 12, the closed end 24 of the bearing cup 22 is disposed adjacent to the end of the trunnion 12, while the inner bearing surface 28 of the bearing cup 22 is disposed co-axially about the outer bearing surface of the trunnion 12.

The inner diameter of the bearing surface 28 of the bearing cup 22 is somewhat larger than the outer diameter of the bearing surface 13 of the trunnion 12. As a result, respective pluralities of conventional needle or roller bearings 32 (only two are illustrated about each of the trunnion 12) may be disposed therebetween in a known manner. The needle bearings 32 are oriented co-axially with is the axis 34 defined by the cylindrical trunnion 12 and are arranged in a circumferential array about the trunnion. As is well known, the needle bearings 32 permit the bearing cup 22 to rotate about the trunnion 12. A thrust plate 36 may be disposed between the upper ends of the needle bearings 32 and the closed end 24 of the bearing cup 22. The thrust plate 36 is conventional in the art.

An annular seal assembly, indicated generally at 40, is provided about the open end 26 of the bearing cup 22. As best shown in FIG. 2, the seal assembly 40 includes a metallic support ring 42, which is generally L-shaped in cross section, having a lower radially outwardly extending flange portion 44 that is connected to an axially extending portion 46. In an alternative embodiment (not shown) the support ring additionally has at a top end a radially inwardly extending flange. The axially extending portion 46 of the support ring is formed having an outer diameter which is approximately equal to the inner diameter of the bearing surface 28 of the bearing cup 22. Thus, the support ring 42 can be pressed into the inner bearing surface 28 of the bearing cup 22 and retained therein by friction. A flat washer 48 positioned on top of the axially extending portion 46 of the support ring extends radially inwardly from the axially extending portion and functions to support the lower ends of the needle bearings 32. The lower flange portion 44 of the support ring extends radially outwardly from the axially extending portion 46 adjacent the open end 26 of the bearing cup 22 and functions as a positive stop when the support ring 42 is pressed therein.

The seal assembly 40 also includes an elastomeric seal 50 that is disposed within the axially extending portion 46 portion of the support ring 42 and is attached thereto by any conventional means, such as by adhesive bonding. The elastomeric seal 50 is conventional and may include a pair of sealing lips 52, 54 that extend radially inwardly. The sealing lips 52, 54 are provided to sealingly engage the outer cylindrical surface 13 of the trunnion 12 when the bearing cup 22 is mounted over the trunnion. The sealing lip 54 is biased radially inward by a surrounding spring 56.

Figure 3:
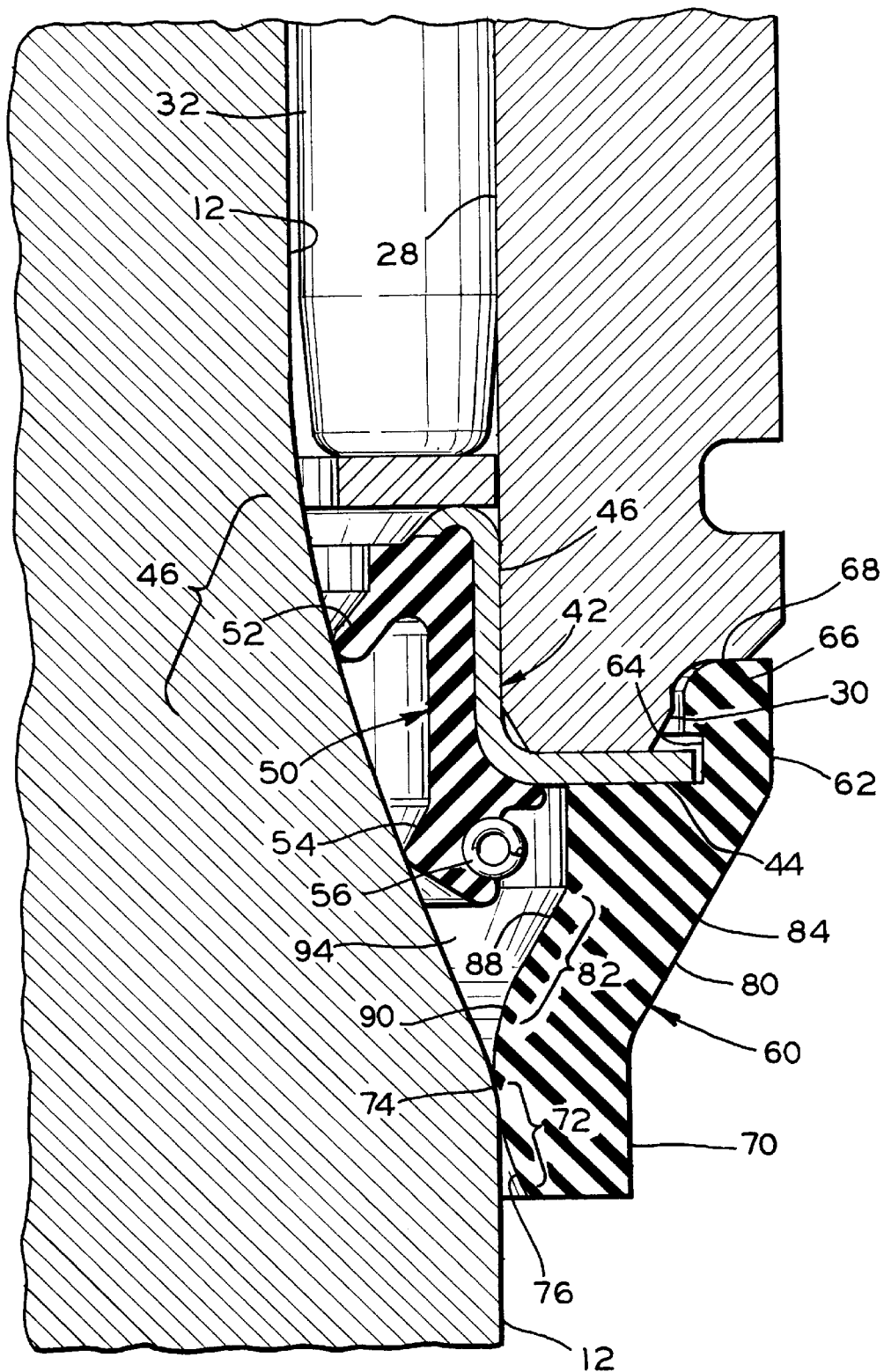
FIG. 3 is an enlarged sectional view of a portion of the seal guard shown in FIG. 2.

An annular seal guard, indicated generally at 60, is removably secured to the seal assembly 40. The seal guard 60 is formed from a flexible, elastomeric material, such as neoprene rubber or other suitable alternative. The seal guard 60 is generally shaped as a converging funnel. As shown in FIG. 3, the seal guard 60 has an upper body portion 62 with an annular interior groove 64. The interior groove 64 has a diameter slightly larger than the circumferential edge diameter of the lower flange portion 44 of the support ring. Thus, the upper body portion 62 can extend relatively loosely about the outer circumferential edge of the lower radially extending flange portion 44 of the support ring.

Formed above the interior groove 64 is an interior directed finger section 66 with a radiused profile 68. The finger 66 is a continuous annular ring. In an alternative embodiment (not shown) the finger section 66 is comprised of a series of geometrically spaced inwardly directed protrusions. The finger 66 defines an inner diameter that is slightly smaller than the outer diameter defined by the outer circumferential edge of the lower radially extending flange portion 44 of the support ring. Therefore, the finger forms a lip to hold the seal guard in place with the support ring.

The seal guard 60 has along a lower end a lower body portion 70. The lower body portion 70 extends axially downward from and is inclined radially inward from the upper body portion 62. The lower body portion 70 has along its interior an interior sealing surface 72 adapted to contact the outer surface of the trunnion 12. The sealing surface 72 is a compound radius surface. The sealing surface has an upper section 74 with a small radius. Joined to the upper section 74 is a sealing surface lower section 76 with a larger radius.

Juxtaposed between the upper body portion 62 and the lower body portion 70 of the seal guard 60 is a mid-body portion 80. The mid-body portion 80 is radially inclined inward and has generally parallel interior and exterior sides 82 and 84. The interior side 82 is curved at its upper radius section 88, and at its lower radius section 90. Preferably, the upper radius section 88 and lower radius section 90 have a curvature equal in radius to the radius of the sealing surface upper section 74 of the lower sealing surface 72, although this configuration is optional.

The assembly of the universal joint cross 10 will now be explained. Initially, the roller bearings 32 are assembled within the bearing cup 22 in a conventional manner. The seal assembly 40 is next pressed into frictional engagement with the inner bearing surface 28 of the bearing cup 22 until the lower flange portion 44 of the support ring 42 abuts the open end 26 of the bearing cup 22. The seal guard 60 is then snapped onto the open end 26 of the bearing cup 22 by moving it axially toward the seal assembly 40. Because the inner diameter defined by the finger 66 is slightly smaller than the outer diameter defined by the outer circumferential edge of the lower radially extending flange portion 44, the finger 66 is initially deflected radially outwardly to pass over the lower radially outwardly extending flange portion 44 of the support ring 42. The radiused profile 68 of the inner circumferential surface of the finger 66 facilitates the above noted engagement and deflection of the finger 66. Further axial movement of the seal guard 60 causes the finger 66 to snap inwardly over the lower radially extending flange portion 44 of the support ring, as shown in FIGS. 1 and 2, and into the reduced outer diameter portion 30 of the bearing cup 22. As a result, the outer circumferential edge of the lower flange portion 44 of the support ring 42 is trapped in the annular groove 64. As mentioned above, the inner diameter of the groove 64 is slightly larger than the outer diameter of the lower radially extending flange portion 44 of the support ring 42. Thus, the seal guard 60 fits somewhat loosely thereon. Because it is formed from a flexible elastomeric material the seal guard 60 may be removed from the seal assembly 40 after being installed simply by plying it off. Lastly, the bearing cup 22 is assembled onto the trunnion 12 by disposing the open end 26 thereof over the end of the trunnion 12 and moving it axially inwardly toward the body portion 11.

Preferably, the sealing surface 72 of the seal guard 60 defines an inner diameter that is slightly smaller than the outer diameter of the trunnion 12 outer sealing surface 18. As a result, when the bearing cup 22 is installed on the trunnion 12 as described above, the seal guard 60 engages the trunnion 12 in a light press fit or interference arrangement. The compound radius of the sealing surface 72 helps to insure a contact band around the trunnion 12. The light press fit arrangement functions to establish a lubrication chamber 94 bordered by the trunnion 12, elastomeric seal 50, and seal guard 60. When filled with grease, the lubrication chamber 94 provides an additional source of lubricant to the seal assembly 40. The grease filled lubrication chamber 94 also provides a waterproof compartment to keep moisture away from the seal assembly 40. Additionally the aforementioned press fit arrangement aids in retaining the bearing cup assembly 20 on the trunnion 12 during shipment and use.

The principle and mode of operation of this invention have been described in its preferred embodiments. However, it should be noted that this invention may be practiced otherwise than as specifically illustrated and described without departing from its scope.

What is claimed is:

1. A seal assembly and seal guard adapted for use with a bearing cup assembly for a cross member of a universal joint comprising:
    a seal assembly including a support ring and a seal secured to said support ring, said support ring including a flange portion; and
    a seal guard formed from a flexible material and including a first portion having a groove formed therein and a second portion having a sealing surface, said support ring flange portion extending within said groove to retain said seal guard with said seal assembly.

2. The seal assembly and seal guard defined in claim 1 wherein said sealing surface is located radially inwardly from said first portion of said seal guard.

3. The seal assembly and seal guard defined in claim 1 wherein said sealing surface is curved and defines a radius.

4. The seal assembly and seal guard defined in claim 3 wherein said sealing surface defines a compound radius.

5. The seal assembly and seal guard defined in claim 4 wherein said sealing surface defines an upper small radius and a lower large radius.

6. The seal assembly and seal guard defined in claim 2 wherein said sealing surface is curved and defines a radius.

7. The seal assembly and seal guard defined in claim 6 wherein said sealing surface defines a compound radius.

8. The seal assembly and seal guard defined in claim 7 wherein said sealing surface defines an upper small radius and a lower large radius.

9. The seal assembly and seal guard defined in claim 1 wherein said seal assembly includes a washer positioned adjacent an axially extending portion of said support ring.

10. The seal assembly and seal guard defined in claim 1 wherein said seal guard includes a middle portion located between said first portion and said second body portion, said middle portion being inclined radially inwardly from said first body portion.

11. The seal assembly and seal guard defined in claim 10 wherein said middle portion has interior and exterior sides that are generally parallel.

12. A bearing cup assembly adapted for use with a cross member of a universal joint comprising:
    a hollow bearing cup having an open end, an inner bearing surface, and a closed end;
    a seal assembly secured to said bearing cup and including a support ring and a seal secured to said support ring, said support ring including a flange portion; and
    a seal guard formed from a flexible material and including a first portion having a groove formed therein and a second portion having a sealing surface, said support ring flange portion extending within said groove to retain said seal guard with said seal assembly.

13. The bearing cup assembly defined in claim 12 wherein said bearing cup includes a reduced outer diameter portion located adjacent to said open end of said bearing cup, a portion of said first portion of said seal guard being received in said reduced outer diameter portion of said bearing cup.

14. The bearing cup assembly defined in claim 12 wherein said support ring includes an axially extending portion that is press fit onto said inner bearing surface to secure said seal assembly to said bearing cup.

15. A cross for a universal joint comprising:
    a body portion having a trunnion extending outwardly from said body portion, said trunnion including an outer bearing surface;
    a bearing cup having an open end, an inner bearing surface, and a closed end, said bearing cup being disposed about said trunnion such that said inner bearing surface of said bearing cup is disposed co-axially about said outer bearing surface of said trunnion;
    a plurality of bearings disposed between said inner bearing surface of said bearing cup and said outer bearing surface of said trunnion for permitting rotation of said bearing cup relative to said trunnion;
    a seal assembly secured to said bearing cup and including a support ring and a seal secured to said support ring, said support ring including a flange portion; and
    a seal guard formed from a flexible material and including a first portion having a groove formed therein and a second portion having a sealing surface, said support ring flange portion extending within said groove to retain said seal guard with said seal assembly.

16. The cross defined in claim 15 wherein said body portion has a plurality of trunnion extending outwardly therefrom, each of said trunnion having a bearing cup disposed co-axially thereabout, a plurality of bearings being disposed between each of said bearing cups and said trunnion, a seal assembly secured to each of said bearing cups and including a support ring and a seal secured to the support ring, each of the support rings including an axially extending portion and a radially extending flange portion, and a flexible elastomeric seal guard secured to each of said seal assemblies, each of said seal guards including an upper body portion with an interior groove, said radially extending flange portions of said support rings being trapped by said upper body portion interior grooves to secure said seal guards to said seal assemblies, and said seal guards having lower body portions extending axially from said upper body portions with interior sealing surfaces.

17. The cross defined in claim 15 wherein said bearing cup includes a reduced outer diameter portion located adjacent said open end of said bearing cup, with a portion of said upper portion of said seal guard, above said seal guard interior groove, being received in said reduced outer diameter portion of said bearing cup.

18. The cross defined in claim 15 wherein said axially extending portion of said support ring is press fit within said bearing cup inner bearing surface to secure said seal assembly to said bearing cup.

19. The cross defined in claim 15 wherein said trunnion has an outer sealing surface lower than said outer bearing surface and said seal guard interior sealing surface has an interference relationship with said trunnion outer cylindrical surface.

20. The cross defined in claim 19 wherein said seal guard interior sealing surface is positioned radially inwardly from said upper body portion of said seal guard.

21. A bearing cup assembly adapted for use with a cross member of a universal joint comprising:
   a hollow bearing cup having an open end, an inner bearing surface, and a closed end;
   a seal assembly secured to said bearing cup and including a support ring and a seal secured to said support ring, said support ring including a flange portion abutting said open end of said bearing cup; and
   a seal guard formed from a flexible material and including a first portion having a groove formed therein and a second portion having a sealing surface, said support ring flange portion extending within said groove to retain said seal guard with said seal assembly.

22. The bearing cup assembly defined in claim 21 wherein said sealing surface is located radially inwardly from said first portion of said seal guard.

23. The bearing cup assembly defined in claim 21 wherein said sealing surface is curved and defines a radius.

24. The bearing cup assembly defined in claim 23 wherein said sealing surface defines a compound radius.

25. The bearing cup assembly defined in claim 21 wherein said seal assembly includes a washer positioned adjacent an axially extending portion of said support ring.

26. The bearing cup assembly defined in claim 21 wherein said seal guard includes a middle portion located between said first portion and said second body portion, said middle portion being inclined radially inwardly from said first body portion.

27. The bearing cup assembly defined in claim 26 wherein said middle portion has interior and exterior sides that are generally parallel.

28. The bearing cup assembly defined in claim 21 wherein said bearing cup includes a reduced outer diameter portion located adjacent to said open end of said bearing cup, a portion of said first portion of said seal guard being received in said reduced outer diameter portion of said bearing cup.

29. The bearing cup assembly defined in claim 21 wherein said support ring includes an axially extending portion that is press fit onto said inner bearing surface to secure said seal assembly to said bearing cup.

* * * * *